(12) United States Patent  
Silbereisen et al.

(10) Patent No.: US 7,992,940 B2
(45) Date of Patent: Aug. 9, 2011

(54) ACTUATING DEVICE FOR A FIXING ROD TO BE DISPLACED IN THE LONGITUDINAL DIRECTION

(75) Inventors: Friedrich Silbereisen, Efringen-Kirchen (DE); Michael De Jong, Binzen (DE); Gunter Tremmel, Schworstadt (DE)

(73) Assignee: A. Raymond et Cie, Grenoble (FR)

( * ) Notice: Subject to any disclaimer, the term of this patent is extended or adjusted under 35 U.S.C. 154(b) by 263 days.

(21) Appl. No.: 12/444,980

(22) PCT Filed: Sep. 12, 2007

(86) PCT No.: PCT/EP2007/007922
§ 371 (c)(1),
(2), (4) Date: Apr. 9, 2009

(87) PCT Pub. No.: WO2008/046478
PCT Pub. Date: Apr. 24, 2008

(65) Prior Publication Data
US 2010/0084905 A1    Apr. 8, 2010

(30) Foreign Application Priority Data

Oct. 13, 2006   (DE) .......................... 10 2006 049 053

(51) Int. Cl.
*B60N 2/48* (2006.01)
(52) U.S. Cl. ...................................................... 297/410

(58) Field of Classification Search .................. 297/408, 297/410, 411.36
See application file for complete search history.

(56) References Cited

U.S. PATENT DOCUMENTS

| 4,600,240 | A  | * | 7/1986  | Suman et al. ................. 297/408 |
| 5,599,067 | A  | * | 2/1997  | Schuelke et al. ......... 297/411.35 |
| 5,711,579 | A  |   | 1/1998  | Albrecht |
| 7,011,371 | B1 | * | 3/2006  | Tsai ......................... 297/411.36 |
| 7,306,287 | B2 | * | 12/2007 | Linardi et al. ................ 297/410 |
| 7,429,082 | B2 | * | 9/2008  | Kraft et al. .................... 297/408 |
| 2003/0107253 | A1 | | 6/2003 | Bartels |
| 2006/0119150 | A1 | | 6/2006 | Hoffmann |

FOREIGN PATENT DOCUMENTS

| DE | 10035972 A1 | 2/2001 |
| DE | 10160929 A1 | 7/2003 |
| DE | 19523358 C3 | 7/2004 |
| DE | 102004059237 B3 | 2/2006 |
| DE | 102005017580 B3 | 9/2006 |
| EP | 1316470 A2 | 6/2003 |
| EP | 1428720 A2 | 6/2004 |

* cited by examiner

Primary Examiner — Peter R. Brown
(74) Attorney, Agent, or Firm — Baker & Daniels LLP

(57) ABSTRACT

An actuating device for a fixing rod (7) that is to be displaced in a longitudinal direction and can be rotated to release a latching connection (9, 10) comprises a coupling slide (4) which can be displaced in a bearing sleeve (2) and which, via a coupling arm (5) fitted pivotably to the bearing sleeve (2), drives a coupling head (6) that is connected in a rotationally fixed manner to the fixing rod (7). The fixing rod (7) can thus be rotated by actuating the coupling slide (4).

9 Claims, 6 Drawing Sheets

ACTUATING DEVICE FOR A FIXING ROD TO BE DISPLACED IN THE LONGITUDINAL DIRECTION

CROSS-REFERENCE TO RELATED APPLICATION

This application is a U.S. National Phase Patent Application based on International Application Serial No. PCT/EP2007/007922 filed Sep. 12, 2007, the disclosure of which is hereby explicitly incorporated by reference herein.

BACKGROUND OF THE INVENTION

1. Field of the Invention

The invention is directed to an actuating device for a fixing rod to be displaced in a longitudinal direction, particularly for a fixing rod for displaceably fastening a headrest to a seat of a motor vehicle.

2. Description of the Related Art

Some known actuating devices are described in DE 195 23 358 C3, DE 10 2004 059 237 B3, and DE 10 2005 017 580 B3. These conventional actuating devices comprise a bearing sleeve that is integrated into a headrest of a motor vehicle. Also present is a coupling slide that is mounted in the bearing sleeve so as to be displaceable in an actuating direction. A mechanism acting on the fixing rod is in engagement with the coupling slide to release the fixing rod for the displacement of same. When the coupling slide is actuated, a latching projection engaged with a latching notch provided in the fixing rod moves out of the latching notch, allowing the fixing rod to be displaced in the longitudinal direction.

SUMMARY OF THE INVENTION

The present invention provides an actuating device which, while being of relatively simple construction permitting efficient installation, causes a rotation of the fixing rod, even under tight spatial conditions, that allows it to be displaced in the longitudinal direction.

By virtue of the fact that in the actuating device according to the invention, a rotation of the fixing rod is effected by means of a coupling arm that is pivotably fitted to the bearing sleeve and is connected in a rotationally fixed manner to a coupling head that is connected to the fixing rod, the easy-to-install actuating device can be used even under tight spatial conditions, since the dimensions of the three components that are relevant due to the manner of operation of the actuating device can be adjusted relatively easily to one another.

In one form thereof, the present invention provides an actuating device for a fixing rod to be displaced in a longitudinal direction, particularly for a fixing rod (7) for a headrest of a motor vehicle, including a bearing sleeve (2), a coupling slide (4) mounted in the bearing sleeve (2) so as to be displaceable in an actuating direction, and a mechanism that acts on the fixing rod (7) and is in engagement with the coupling slide (4) to release the fixing rod (7) for the displacement of same, characterized in that the mechanism is equipped with a coupling arm (5), which is pivotably fitted to the bearing sleeve (2) and is able to pivot with the coupling head (4) over an angle range, and with a coupling head (6) that is to be connected in a rotationally fixed manner to the fixing rod (7) and is coupled to the coupling arm (5) in such a way that the pivoting movement initiated by the actuation of the coupling slide is transmitted as rotary movement to the coupling head (6).

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
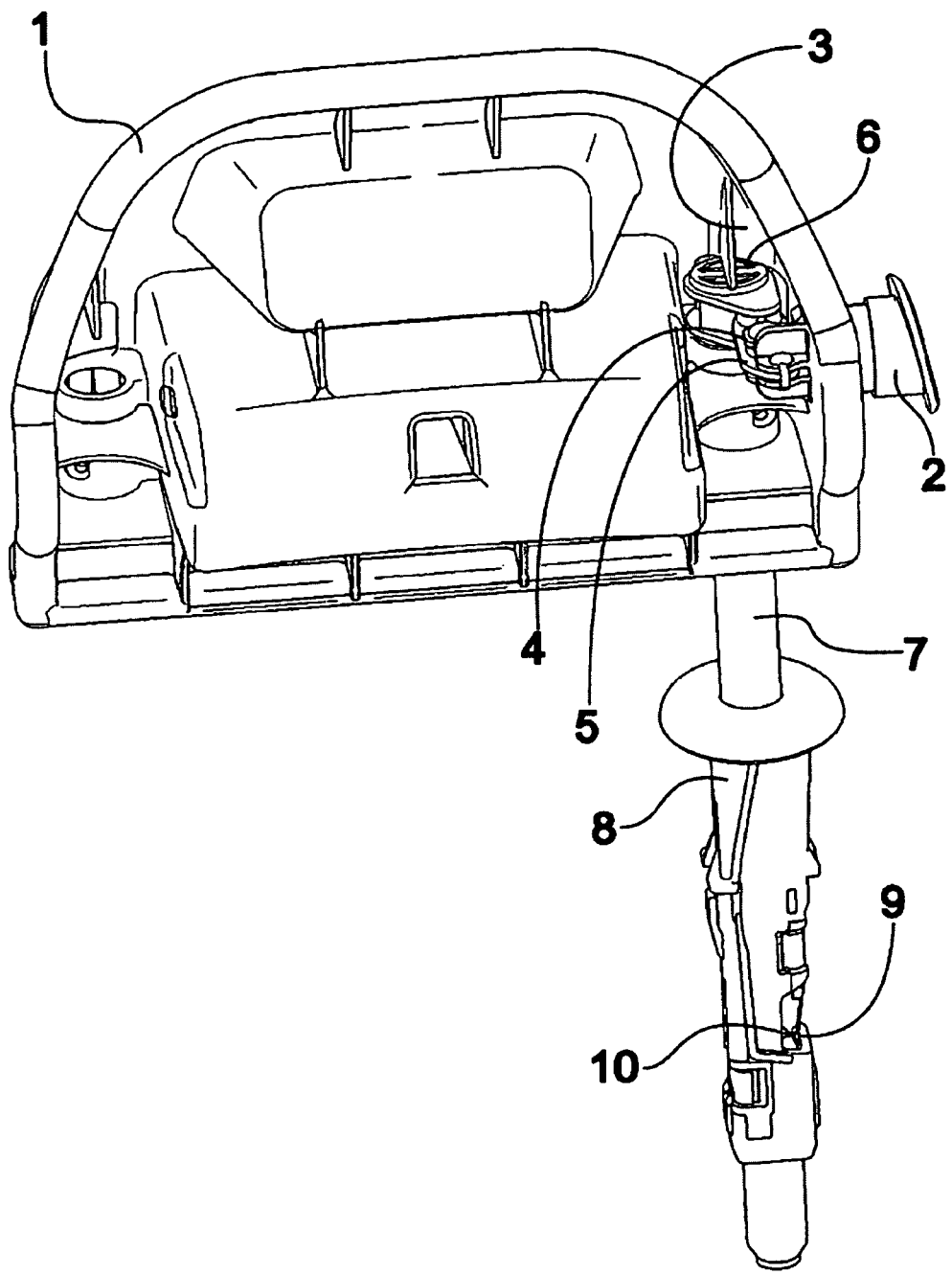
FIG. 1 is a perspective view of an exemplary embodiment of an actuating device according to the invention in an installed situation in a headrest of a motor vehicle, together with a fixing rod fitted to a coupling head of the actuating device.

Corresponding reference characters indicate corresponding parts throughout the several views. Although the exemplifications set out herein illustrate embodiments of the invention, in several forms, the embodiments disclosed below are not intended to be exhaustive or to be construed as limiting the scope of the invention to the precise forms disclosed.

DETAILED DESCRIPTION

FIG. 1 is a perspective view of an exemplary embodiment of an actuating device according to the invention in an installed situation in the headrest shell 1 of a headrest of a motor vehicle. The actuating device according to the invention comprises a bearing sleeve 2, which is attached to a side wall 3 of the headrest shell 1. A coupling slide 4 is held in the bearing sleeve 2 so as to be displaceable in an actuating direction, and is connected by one end to a middle portion of a coupling arm 5. Coupling arm 5 in turn is connected by one end to the bearing sleeve 2 and by the other end to a coupling head 6, which in turn is mated onto one end of a fixing rod 7 that engages through the headrest shell 1.

Fixing rod 7 mates by its end portion remote from coupling head 6 into a rod guide sleeve 8, which in turn is fixedly anchored in a motor vehicle seat (not shown in FIG. 1). Configured on rod guide sleeve 8 is a latching projection 9, which in the arrangement according to FIG. 1 engages in a latching notch 10 provided in fixing rod 7, so as to block displacement of fixing rod 7 in the longitudinal direction relative to rod guide sleeve 8. To release the engagement between latching projection 9 and latching notch 10 in order to adjust the headrest with respect to its distance from the seat, fixing rod 7 is rotated.

Figure 2:
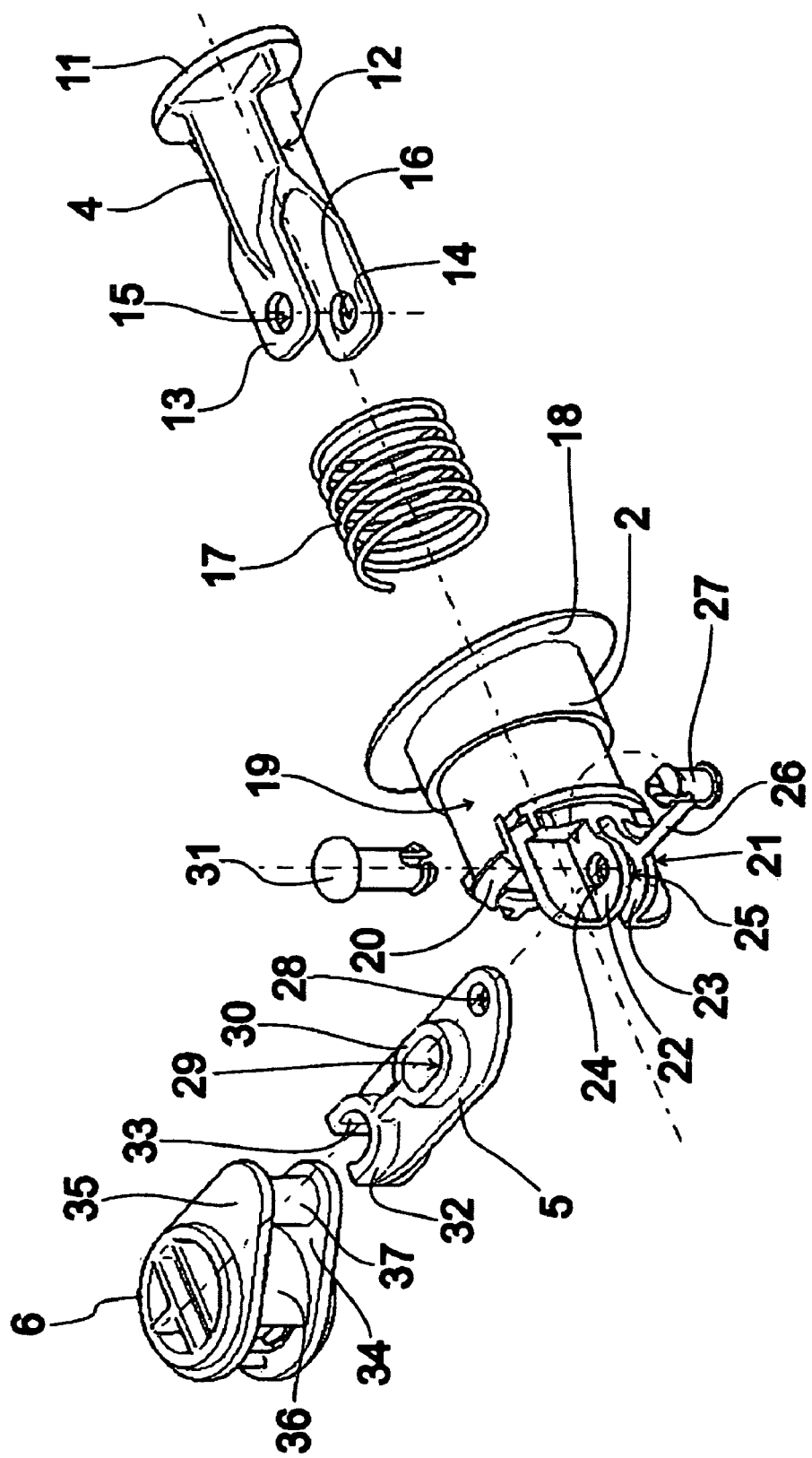
FIG. 2 is an exploded perspective view of the exemplary embodiment according to FIG. 1.

FIG. 2 is an exploded perspective view of the exemplary embodiment of an actuating device according to the invention as depicted in FIG. 1. It can be seen from FIG. 2 that coupling slide 4 has at one end a roundish-shaped, flat pressure plate 11, which is formed onto a guide portion 12 formed by a number of longitudinal ribs set at right angles to one another. At the end of guide portion 12 remote from pressure plate 11, coupling slide 4 comprises flat, mutually parallel slide clevis arms 13, 14, in each of which is provided a respective slide clevis arm opening 15, 16, said openings being in mutual alignment.

In the exemplary embodiment described, the actuating device according to the invention is further equipped with a spirally wound compression spring 17, whose inner diameter is so adapted that the coupling slide 4 can be inserted by its guide portion 12 and the slide clevis arms 13, 14 into the interior space of compression spring 17 while pressure plate 11 abuts one end of compression spring 17. The respective outer diameters of pressure plate 11 and of compression spring 17 are substantially the same.

Bearing sleeve 2 is provided at one end with an abutment ring 18, which protrudes radially beyond a receiving portion 19 of bearing sleeve 2, and in the installed situation abuts the outer face of a casing of the headrest shell 1. The inner diameter of the receiving portion 19 of bearing sleeve 2 substantially corresponds to the outer diameter of compression spring 17 and of pressure plate 11. At the end of receiving portion 19 remote from abutment ring 18, bearing sleeve 2 is configured with resilient snap projections 20, 21, which in the installed situation according to FIG. 1 engage behind the side wall 3 of the headrest shell 1 and thereby connect the bearing sleeve 2 to the headrest shell 1. Bearing sleeve 2 is further configured with two mutually opposite, mutually parallel sleeve clevis arms 22, 23, which are formed onto the end of receiving portion 19 remote from abutment ring 18. Each sleeve clevis arm 22, 23 is configured with a sleeve clevis arm opening 24, 25, which openings are arranged in mutual alignment. Formed on one sleeve clevis arm 22, 23 is a tie strip 26 that connects a clevis-type coupling arm hinge pin 27 configured with an endwise snap collar to the bearing sleeve 2.

In the exemplary actuating device, the coupling arm 5 is configured as a straight, flat piece, in one end of which is provided a coupling arm bearing opening 28 with a diameter that corresponds to the diameter of the sleeve clevis arm openings 24, 25. The thickness of coupling arm 5 in the region of coupling arm bearing opening 28 and the distance between the sleeve fork arms 22, 23 are so adapted that the end of coupling arm 5 that contains coupling arm bearing opening 28 can be fitted between sleeve clevis arms 22, 23, with the result that when coupling arm hinge pin 27 is mated through sleeve clevis arm openings 24, 25 and coupling arm bearing opening 28, a coupling arm clevis joint is created that is fixed in the longitudinal direction of coupling arm 5.

Present in the middle region of coupling arm 5 is a coupling arm actuating opening 29 that extends in the manner of an oblong hole, with a longitudinal portion, in the longitudinal direction of coupling arm 5, that is longer than the width of said coupling arm actuating opening 29. Said coupling arm actuating opening 29 is preferably, as depicted in FIG. 2, surrounded by a rim 30 that protrudes on both sides and whose thickness substantially corresponds to the distance between slide clevis arms 13, 14. The width of coupling arm actuating opening 29 corresponds to the diameter of slide clevis openings 15, 16, with the result that when a coupling slide hinge pin 31 is inserted through slide clevis arm openings 15, 16 and coupling arm actuating opening 29, with the coupling slide clevis joint configured in this way, the coupling slide hinge pin 31 can be displaced in the longitudinal direction of coupling arm 5.

Coupling arm 5 has at the opposite end from coupling arm bearing opening 28 two opposing coupling arm clevis members 32, 33, which extend toward each other endwise by a terminating portion, the distance between said terminating portions being smaller than the largest distance between said coupling arm clevis members 32, 33.

It is further apparent from the representation according to FIG. 2 that coupling head 6 is provided with two opposing coupling head clevis members 34, 35, which extend parallel to each other radially away from a roundish rod receiving portion 36. Extending between the ends of coupling head clevis members 34, 35 remote from rod receiving portion 36 is a coupling head hinge pin 37 that is fixedly connected to coupling head clevis members 34, 35 and whose outer diameter corresponds to the inner diameter of a receiving space surrounded by coupling arm clevis members 32, 33. Coupling arm clevis members 32, 33 thus embrace coupling head hinge pin 37, except for a free region, when said coupling head hinge pin 37 is inserted in the receiving space, and fix coupling head 6 pivotably on coupling arm 5 by means of the coupling head clevis joint formed in this way.

Figure 3:
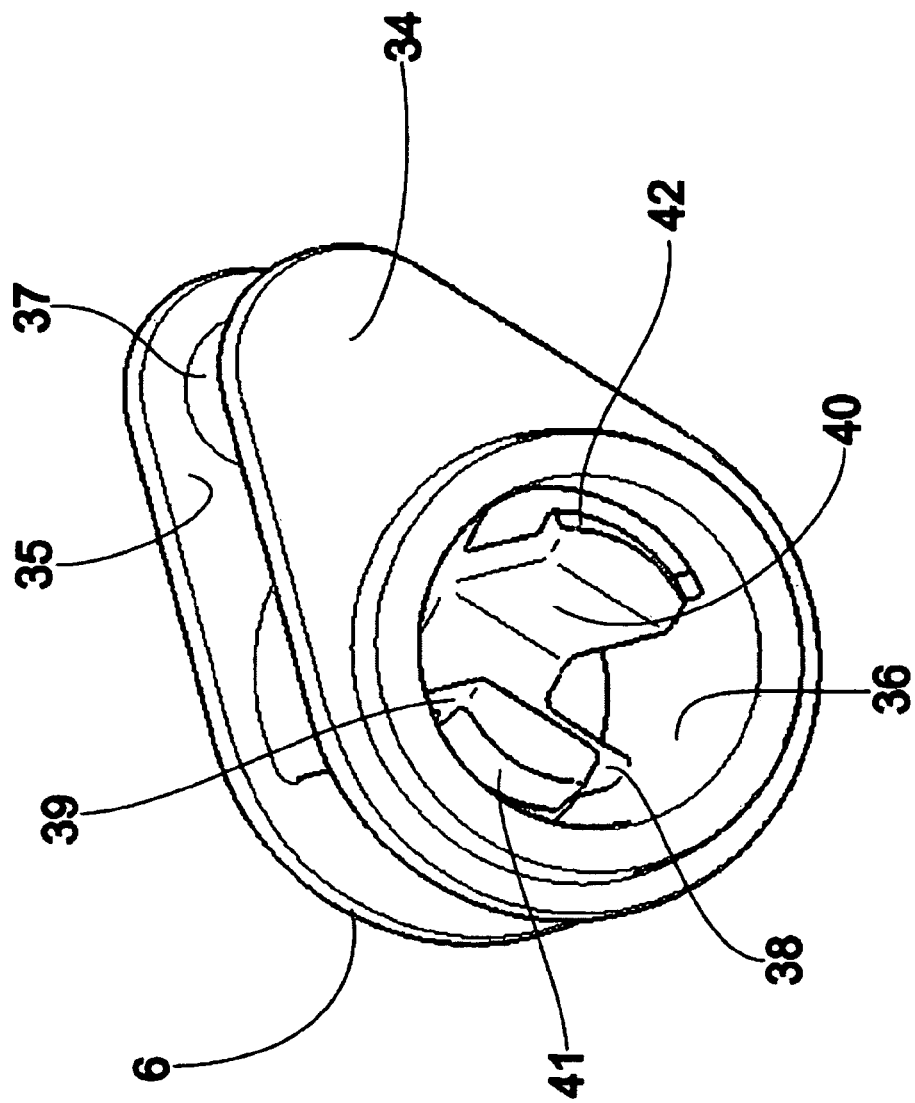
FIG. 3 is a perspective view of the coupling head of the exemplary embodiment according to FIGS. 1 and 2, looking at the side facing the fixing rod.

FIG. 3 is a perspective view of the coupling head 6 according to the exemplary embodiment described, looking at the insertion end of the fixing rod 7 (not shown in FIG. 3). It can be seen from FIG. 3 that the rod receiving portion 36 comprises an alignment web 38 that extends in the radial direction from the outer wall of rod receiving portion 36 into the central region. On each side of alignment web 38, coupling head 6 comprises leaf-like engaging arms 39, 40, which extend in the longitudinal direction of rod receiving portion 36 and at whose ends are formed locking projections 41, 42 that flare outward radially.

Figure 4:
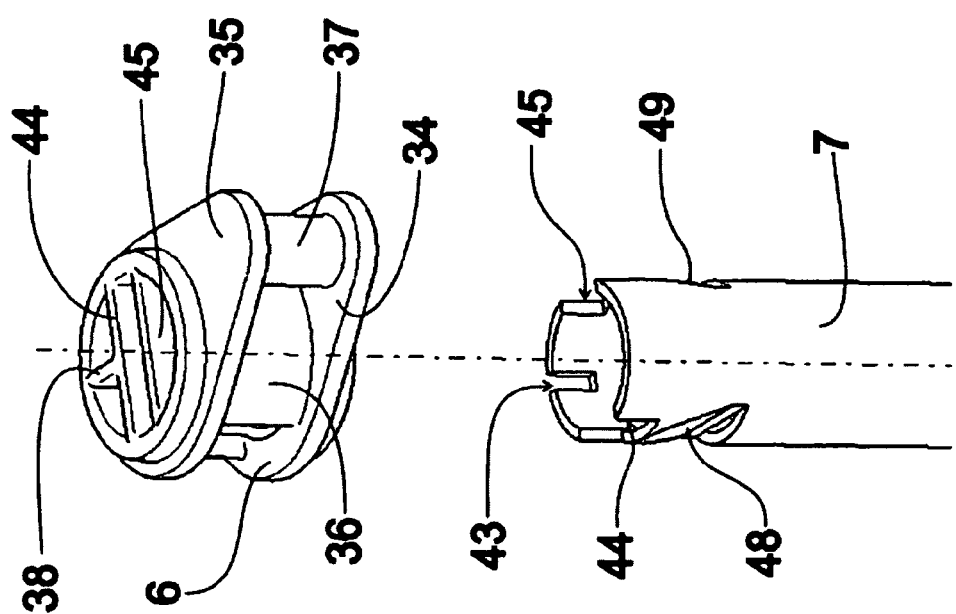
FIG. 4 is a perspective view of the coupling head of the exemplary embodiment according to FIGS. 1 to 3, with a fixing rod arranged to receive the coupling head.

FIG. 4 is a perspective view of the coupling head 6 according to the exemplary embodiment of FIGS. 1 to 3 and fixing rod 7, by the end remote from the rod guide sleeve 8 and destined to be inserted in the coupling head 6. It can be appreciated from FIG. 4 that the end of fixing rod 7 that is to be inserted in coupling head 6 is provided, on the one hand, with an alignment notch 43 adapted to receive alignment web 38, and, on the other hand, with engagement notches 44, 45 disposed on both sides of alignment notch 43 and operative to receive transverse webs 46, 47 connected to the engaging arms 39, 40. Formed in prolongation of said transverse webs 46, 47 in the longitudinal direction of fixing rod 7 are radially inwardly extending stamped-in portions 48, 49, whose extent in the longitudinal direction is so adapted that when coupling head 6 is placed on the working end of fixing rod 7, the locking projections 41, 42 engage behind the stamped-in portions 48, 49. Coupling head 6 is thereby connected in a rotationally fixed manner to the fixing rod 7.

Figure 5:
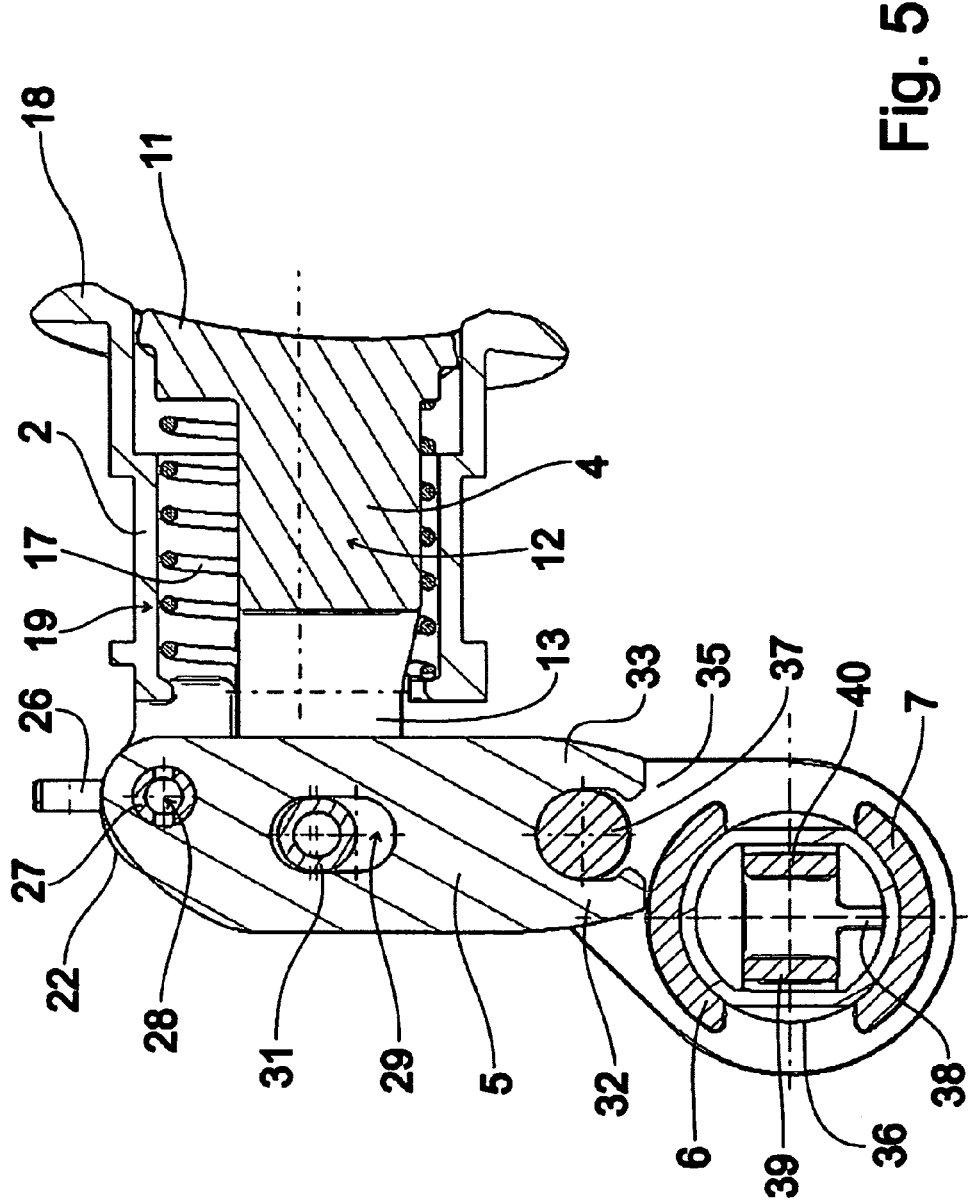
FIG. 5 shows the exemplary embodiment according to FIG. 1 in section in a first pivot position.

FIG. 5 shows the exemplary embodiment according to FIG. 1 in section in a first pivot position, in which the compression spring 17 presses the coupling slide 4 into a position in which the outer face of the pressure plate 11 is flush with the outer face of abutment ring 18, and coupling slide hinge pin 31 is located at the end of coupling arm actuating opening 29 that is proximate the coupling arm bearing opening 28. In this position of coupling arm 5, the fixing rod 7 is in the orientation shown in FIG. 1, in which the latching projection 9 configured on rod guide sleeve 8 is engaged with a latching notch 10 configured in fixing rod 7, and the fixing rod is therefore blocked against displacement in its longitudinal direction.

Figure 6:
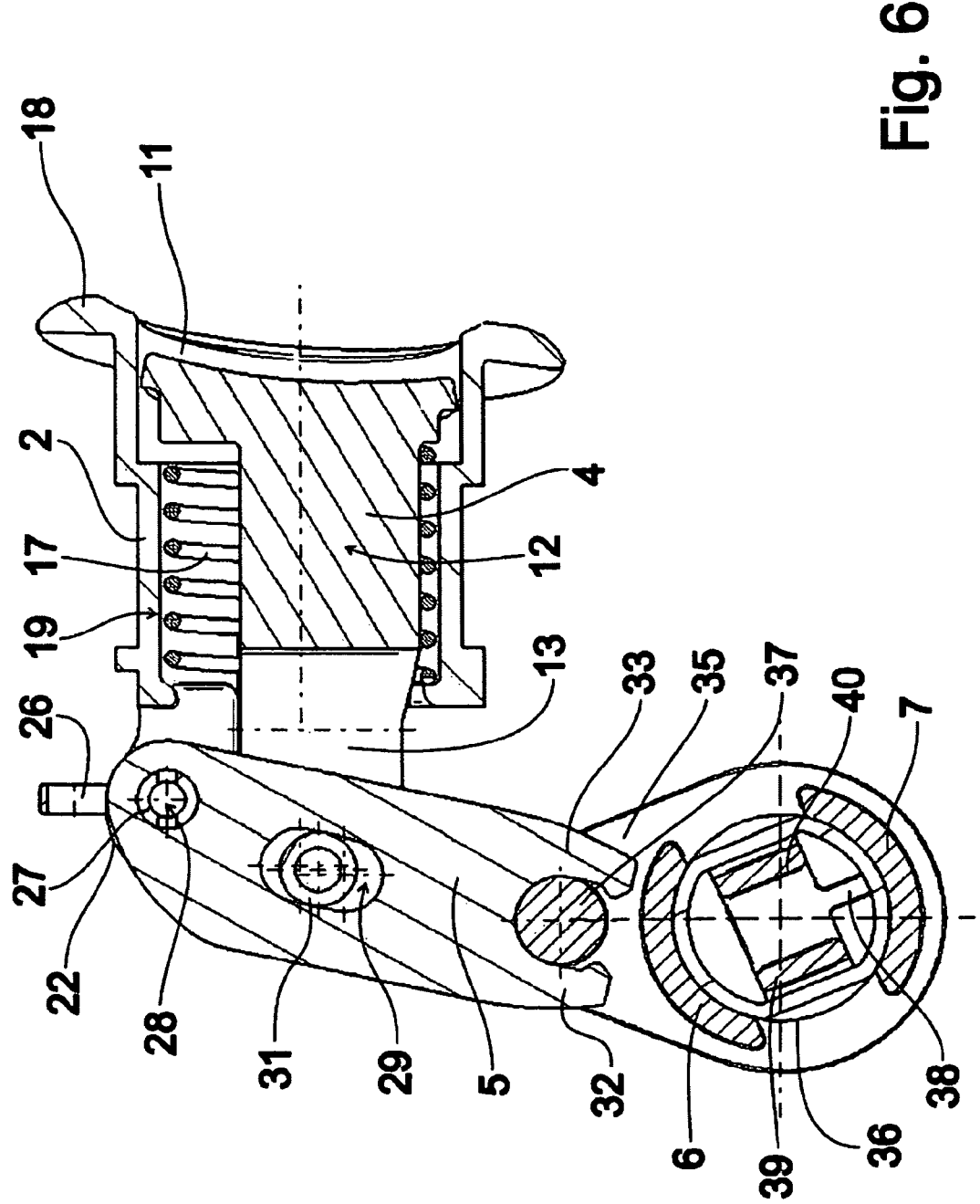
FIG. 6 shows the exemplary embodiment according to FIG. 1 in section in a second pivot position.

FIG. 6 shows the exemplary embodiment according to FIG. 1 in section in a second pivot position, in which the coupling slide 4 is pushed in against the pressure of the compression spring 17 by the exertion of a pressure force on pressure plate 11. In this second, intermediate pivot position, the coupling slide hinge pin 31 is disposed approximately in the center of coupling arm actuating opening 29, and coupling head 6, together with fixing rod 7 rotationally fixedly connected thereto, rotates out of the first pivot position according to FIG. 5. In the second pivot position, the engagement between latching projection 9 and latching notch 10 is partially released, said engagement between latching projection 9 and latching notch 10 being released completely by moving coupling slide 4 until coupling slide hinge pin 31 abuts the end of coupling arm actuating opening 29 proximate the coupling arm clevis members 32, 33, thus allowing fixing rod 7 to be displaced in its longitudinal direction.

As soon as force ceases to be applied to pressure plate 11, compression spring 17 presses coupling slide 4 away from coupling arm 5, thus causing fixing rod 7 to move back into the orientation it had in the first pivot position according to FIG. 5, and latching projection 9 to re-enter into engagement with a latching notch 10 as soon as fixing rod 7 is in the proper relative position.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An actuating device for use in rotating a fixing rod for a headrest of a motor vehicle to allow displacement of the fixing rod in a longitudinal direction, the fixing rod rotatable between a locked position in which the fixing rod is prevented from displacement in the longitudinal direction and an unlocked position in which the fixing rod is displaceable in the longitudinal direction, said actuating device comprising:
   a bearing sleeve;
   a coupling slide mounted in said bearing sleeve, said coupling slide displaceable in an actuating direction; and
   a mechanism in engagement with said coupling slide and adapted to rotate the fixing rod, said mechanism comprising:
      a coupling arm, said coupling arm pivotably fitted to said bearing sleeve, said coupling arm pivotable with said coupling slide over an angle range; and
      a coupling head rotationally fixedly connected to the fixing rod, said coupling head coupled to said coupling arm whereby pivoting movement initiated by the actuation of said coupling slide is transmitted as rotary movement to said coupling head to in turn rotate the fixing rod between the locked position and the unlocked position.

2. The actuating device of claim 1, further comprising a compression spring retained under compression between said bearing sleeve and said coupling slide.

3. The actuating device of claim 1, wherein said bearing sleeve and an end of said coupling arm are connected to each other via a coupling arm clevis joint, said coupling arm clevis joint fixed in a longitudinal direction of said coupling arm.

4. The actuating device of claim 3, wherein said coupling arm clevis joint further comprises a detachable coupling arm hinge pin engageable through sleeve clevis arms configured on said bearing sleeve and through a coupling arm bearing opening configured in said coupling arm.

5. The actuating device of claim 1, wherein said coupling slide and said coupling arm are connected to each other via a coupling slide clevis joint, said coupling slide clevis joint positioned between the ends of said coupling arm, said coupling slide clevis joint displaceable in the longitudinal direction of said coupling arm.

6. The actuating device of claim 5, wherein said coupling slide clevis joint further comprises a detachable coupling slide hinge pin, said coupling slide hinge pin extending through a pair of slide clevis arms formed on said coupling slide and through a coupling arm actuating opening formed in the middle region of said coupling arm, said coupling arm actuating opening shaped as an oblong hole extending in the longitudinal direction of said coupling arm.

7. The actuating device of claim 6, further comprising a rim configured on both sides of said coupling arm actuating opening, said rim having a thickness corresponding to the distance between said pair of slide clevis arms.

8. The actuating device of claim 1, wherein said coupling arm and said coupling head are connected to each other via a coupling head clevis joint, said coupling head clevis joint being fixed in the longitudinal direction of said coupling head.

9. The actuating device of claim 8, wherein said coupling head clevis joint further comprises a stationary coupling head pin connected to coupling head clevis members formed on said coupling head, said coupling head clevis members substantially embraced by coupling arm clevis members formed on said coupling arm.

* * * * *